US008409118B2

(12) United States Patent
Agrawal et al.

(10) Patent No.: US 8,409,118 B2

(45) Date of Patent: Apr. 2, 2013

(54) UPPER ARM WEARABLE EXOSKELETON

(75) Inventors: Sunil Agrawal, Newark, DE (US); Venketesh Dubey, Bournemouth (GB); John Gangloff, Newark, DE (US); Elizabeth Brackbill, Newark, DE (US)

(73) Assignee: University of Delaware, Newark, DE (US)

(*) Notice: Subject to any disclaimer, the term of this patent is extended or adjusted under 35 U.S.C. 154(b) by 803 days.

(21) Appl. No.: 12/568,541

(22) Filed: Sep. 28, 2009

(65) Prior Publication Data

US 2010/0113987 A1 May 6, 2010

Related U.S. Application Data

(60) Provisional application No. 61/100,407, filed on Sep. 26, 2008.

(51) Int. Cl.

*A61H 1/00* (2006.01)
*A61H 1/02* (2006.01)
*A61H 5/00* (2006.01)

(52) U.S. Cl. ................................ 601/5; 601/33; 601/23

(58) Field of Classification Search .................... 601/33, 601/23, 5, 11, 34–36, 27, 28, 29; 482/51, 482/79, 1; 602/5, 16, 20–23, 26, 27

See application file for complete search history.

(56) References Cited

U.S. PATENT DOCUMENTS 4,180,870 A * 1/1980 Radulovic et al. .............. 623/26
5,501,656 A * 3/1996 Homma et al. ................. 601/33
5,601,527 A * 2/1997 Selkowitz ....................... 601/23
5,865,770 A * 2/1999 Schectman ..................... 601/23
8,142,379 B2 * 3/2012 Verdonk et al. ................. 602/16
2003/0120183 A1 * 6/2003 Simmons ...................... 600/595
2008/0161971 A1 * 7/2008 Buckingham et al. ........ 700/258
2008/0304935 A1 * 12/2008 Scott et al. ........................ 414/5
2011/0245738 A1 * 10/2011 Agrawal et al. ................. 601/33

OTHER PUBLICATIONS

Agrawal, Sunil K., "Design and Optimization of a Cable Driven Upper Arm Exoskeleton", Journal of Medical Devices, vol. 3, Transactions of the ASME (Sep. 2009), pp. 031004-1-031004-8.

Balasubramanian, Sivakumar, "RUPERT: An Exoskeleton Robot for Assisting Rehabilitation of Arm Functions", Virtual Rehabilitation (2008), 163-167.

Ball, Stephen J., "A Planar 3DOF Robotic Exoskeleton for Rehabilitation and Assessment", Proceedings of the 29th Annual International Conference of the IEEE EMBS, (Aug. 23-26, 2007), 4024-4027.

Brackbill, Elizabeth A., "Dynamics and Control of a 4-dof Wearable Cable-Driven Upper Arm Exoskeleton", IEEE International Conference on Robotics and Automation (May 12-17, 2009), 2300-2305.

(Continued)

*Primary Examiner* — Steven Douglas
*Assistant Examiner* — Colin W Stuart
(74) *Attorney, Agent, or Firm* — RatnerPrestia

(57) ABSTRACT

An exoskeleton having a first cuff adapted to be coupled to a user's lower limb is disclosed. The exoskeleton also includes a second cuff adapted to be coupled to the user's upper limb and a third cuff adapted to be coupled to the user's body. A first motor is mounted on the third cuff and has a first motor output coupled to the first cuff. A second motor is mounted on the third cuff and has a second motor output coupled to the second cuff. A processor is operatively coupled to the first and second motors to manipulate the first cuff and the second cuff relative to the third cuff such that the first cuff and the second cuff are able to move the user's lower limb and upper limb. A method of operating the exoskeleton is also disclosed.

10 Claims, 3 Drawing Sheets

OTHER PUBLICATIONS

Carignan, Craig, "Distributed Control and Safety System for a Rehabilitation Arm Exoskeleton", Abstract, ASME Conf. Proc., vol. 9: Mechanical Systems and Control, Parts A, B, and C, Mechanical Systems and Control, Symposium on Advances in Robot Dynamics and Control, Paper No. IMECE 2007-41922 (2007), 1 pg.

Carignan, Craig, "Design of an Arm Exoskeleton with Scapula Motion for Shoulder Rehabilitation", Proceedings of the 12th International Conference on Advanced Robotics, ICAR'05, (2005), 524-531.

Gupta, Abhishek, "Design of a Haptic Arm Exoskeleton for Training and Rehabilitation", IEEE/ASME Transactions on Mechatronics, vol. 11, No. 3 (Jun. 2006), 280-289.

Ikuta, Koji, "Safety Evaluation Method of Design and Control for Human-Care Robots", International Journal of Robotics Research, vol. 22, No. 5 (May 2003), 281-297.

Kiguchi, Kazuo, "Development of a 3DOF Mobile Exoskeleton Robot for Human Upper-Limb Motion Assist", Robotics and Autonomous Systems, vol. 56 (2008), 678-691.

Mao, Ying, "Wearable Cable-Driven Upper Arm Exoskeleton—Motion with Transmitted Joint Force and Moment Minimization", IEEE International Conference on Robotics and Automation (May 3-8, 2010), 4334-4339.

Perry, Joel C., "Upper-Limb Powered Exoskeleton Design", IEEE/ASME Transactions on Mechatronics, vol. 12, No. 4 (Aug. 2007), 408-416.

Martinez F., "Design of a Five Actuated DoF Upper Limb Exoskeleton Oriented to Workplace Help", Proceedings of the 2nd Blennial IEEE/RAS-EMBS International Conference on Biomedical Robotics and Biomechatronics (Oct. 19-22, 2008), 169-174.

Roderick, Stephen N., "An Approach to Designing Software Safety Systems for Rehabilitation Robots", Proceedings of the IEEE 9th International Conference on Rehabilitation Robotics (Jun. 28-Jul. 1, 2005), 252-257.

Tsagarakis, N. G., "Development and Control of a 'Soft-Actuated' Exoskeleton for Use in Physiotherapy and Training", Autonomous Robots, vol. 15 (2003), 21-33.

Yang, Guilin, "Kinematic Design of a 7-DOF Cable-Driven Humanoid Arm: A Solution-in-Nature Approach", Proceedings of the IEEE/ASME International Conference on Advanced Intelligent Mechatronics (Jul. 24-28, 2005), 444-449.

* cited by examiner

UPPER ARM WEARABLE EXOSKELETON

CROSS REFERENCE TO RELATED APPLICATIONS

This application claims priority to provisional application No. U.S. 61/100,407, filed Sep. 26, 2008, which is incorporated herein, in its entirety, by reference.

FIELD OF THE INVENTION

The present invention relates to an exoskeleton apparatus designed to assist and train upper-arm movements that can be worn by users to help perform daily tasks.

BACKGROUND OF THE INVENTION

Over the past several years, upper-arm training devices have been developed to assist in rehabilitating patients who have suffered loss of arm movement, such as due to an injury or stroke. Due to the size and weight of these devices, however, their use has been restricted to clinics and research laboratories. There exists a need to develop a device to assist and train arm movements of stroke survivors or subjects with weak musculature that can be worn by the user to perform daily tasks.

SUMMARY OF THE INVENTION

Briefly, the present invention provides an exoskeleton comprising a first cuff adapted to be coupled to a user's lower limb and a second cuff adapted to be coupled to the user's upper limb. A third cuff is adapted to be coupled to the user's body. A first motor is mounted on the third cuff and has a first motor output coupled to the first cuff. A second motor is mounted on the third cuff and has a second motor output coupled to the second cuff. A processor is operatively coupled to the first and second motors to transmit signals to manipulate the first cuff and the second cuff relative to the third cuff such that the first cuff and the second cuff are able to move the user's lower limb and upper limb.

Further, the present invention also comprises a method of operating an exoskeleton comprising the steps of providing the exoskeleton described above on a user's arm; and transmitting a signal from the processor to at least one of the first and second motors to operate at least one of the first and second motors, wherein the user's arm is manipulated by the exoskeleton to perform a predetermined task.

BRIEF DESCRIPTION OF THE DRAWINGS

The foregoing summary, as well as the following detailed description of exemplary embodiments of the invention, will be better understood when read in conjunction with the appended drawings, which are incorporated herein and constitute part of this specification. For the purposes of illustrating the invention, there are shown in the drawings exemplary embodiments of the present invention. It should be understood, however, that the invention is not limited to the precise arrangements and instrumentalities shown. In the drawings, the same reference numerals are employed for designating the same elements throughout the several figures. In the drawings.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the disclosure without departing from the invention.

Referring to the figures in general, an exoskeleton 100 for use in assisting a user manipulate his/her limbs is disclosed. While exoskeleton 100 is described herein for use with the user's arm, those skilled in the art will recognize that exoskeleton 100 may be used with the user's leg without departing from the spirit and scope of the present invention. Further, while the user's arm is described, those skilled in the art will recognize that exoskeleton 100 may alternatively be used with a prosthetic limb.

Figure 1:
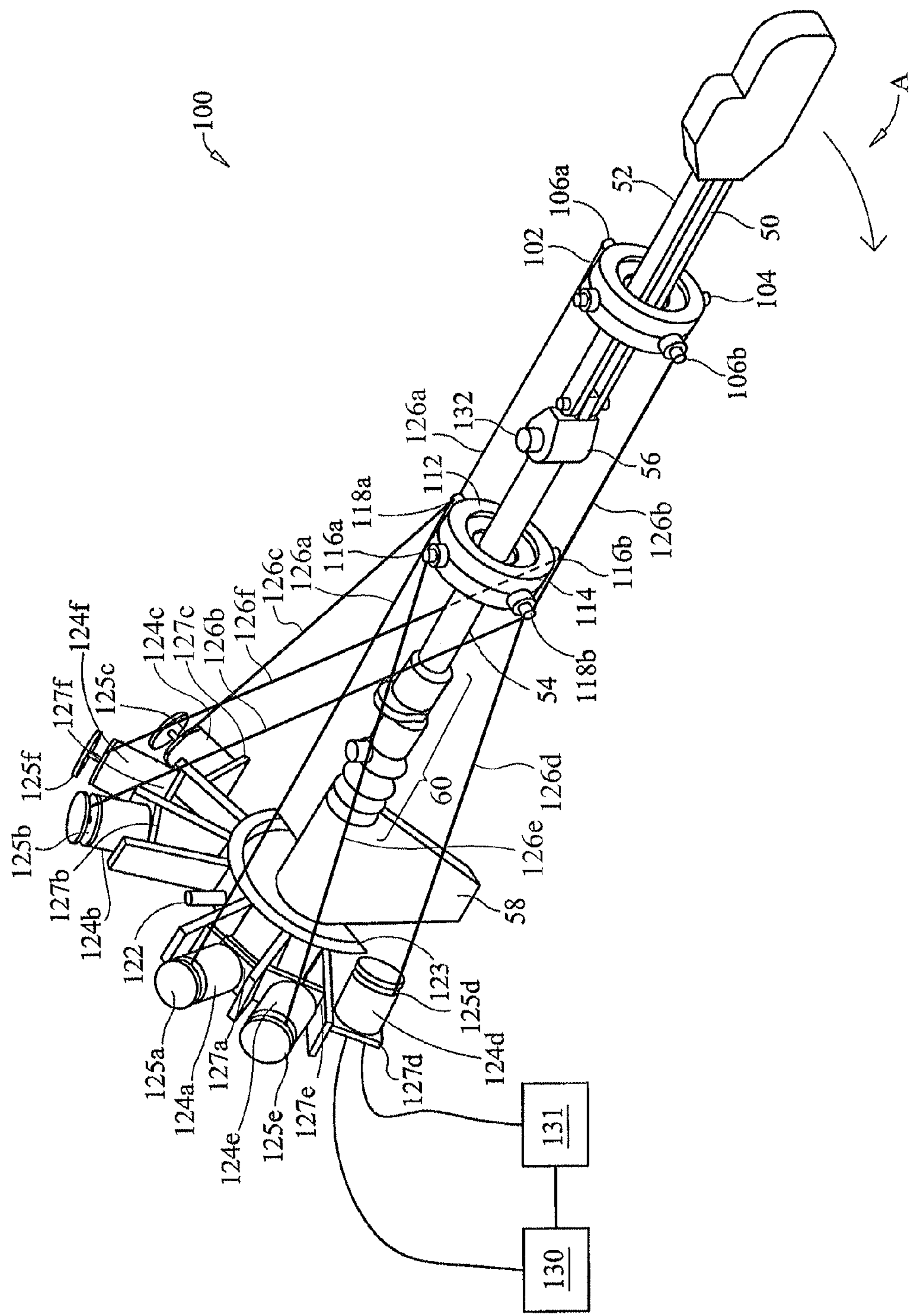
FIG. 1 is a perspective view of an upper arm exoskeleton according to a first embodiment of the present invention, with the exoskeleton coupled to a mechanical arm.

Referring now to FIG. 1, exoskeleton 100 is illustrated with a mechanical arm 50 in order to better illustrate connections of exoskeleton 100 with arm 50. Arm 50 includes a lower arm, or forearm, 52 and an upper arm 54. An elbow joint 56 pivotally couples forearm 52 to upper arm 54 and allows forearm 52 to pivot in a plane relative to upper arm 54. Arrow "A" in FIG. 1 illustrates the direction of the bending of elbow joint 56 to bend forearm 52 inward relative to upper arm 54.

Upper arm 54 is also pivotally coupled to a body, such as on a scapula 58, which allows upper arm 54 to pivot along an infinite plurality of planes relative to body 58 to simulate movement of upper arm 54 relative to scapula 58 about a shoulder 60.

Exoskeleton 100 includes a first cuff 102 that is adapted to be coupled to forearm 52. In an exemplary embodiment, cuff 102 may be coupled to forearm 52 at approximately half the length of forearm 52. Those skilled in the art, however, will recognize that cuff 102 may be coupled to forearm 52 at other locations along the length of forearm 52.

First cuff 102 is generally annularly shaped with a central opening sized to allow forearm 52 to extend therethrough. An inner perimeter of first cuff 102 includes an annular insulator sleeve 104 that engages forearm 52 and supports first cuff 102 on forearm 52. Insulator sleeve 104 may be constructed from an inflatable or otherwise resilient material, such as, for example, DELRIN®, which is flexible to provide comfort to the user.

First cuff 102 includes a pair of diametrically opposed connection points **106*a*, 106*b* that are used to manipulate first cuff 102 and forearm 52. Connection points 106*a*, 106*b* are located in the plane of the pivot of forearm 52 relative to upper arm 54**.

Exoskeleton 100 includes a second cuff 112 that is adapted to be coupled to upper arm 54. In an exemplary embodiment, second cuff 112 may be coupled to upper arm 54 at approximately half the length of upper arm 54. Those skilled in the art, however, will recognize that second cuff 112 may be coupled to upper arm 54 at other locations along the length of upper arm 54.

Second cuff 112 is generally annularly shaped with a central opening sized to allow upper arm 54 to extend therethrough. An inner perimeter of second cuff 112 includes an annular insulator sleeve 114 that engages upper arm 54 and supports second cuff 112 on upper arm 54. Insulator sleeve

114 may be constructed from an inflatable or otherwise resilient material, such as, for example, DELRIN®, which is flexible to provide comfort to user 50.

Second cuff 112 includes a pair of diametrically opposed connection points 116*a*, 116*b* that are used to manipulate second cuff 102 and upper arm 54. In an exemplary embodiment, connection points 116*a*, 116*b* are located about 90 degrees around second cuff 112 relative to connection points 106*a*, 106*b* on first cuff 102. Second cuff 112 also includes a pair of diametrically opposed redirection points 118*a*, 118*b* that extend along the plane of the pivot of forearm 52 relative to upper arm 54. While, in the exemplary embodiment, connection points 116*a*, 116*b* and redirection points 118*a*, 118*b* are each spaced at about 90 degree increments around the outer perimeter of cuff 112 from an adjacent connection point 116*a*, 116*b* or redirection point 118*a*, 118*b*, those skilled in the art will recognize that spacings between adjacent connection points 116*a*, 116*b* and redirection points 118*a*, 118*b* may be more or less than 90 degrees.

Exoskeleton 100 also includes a third, or shoulder, cuff 122 that is adapted to be coupled to the user's body, such as on scapula 58. Shoulder cuff 122 has a generally inverted "U" shape and includes an insulator sleeve 123 on the inner face of shoulder cuff 122. Insulator sleeve 123 supports shoulder cuff 122 on scapula 58. Insulator sleeve 124 may be constructed from an inflatable or otherwise resilient material, such as, for example, DELRIN®, which is flexible to provide comfort to user 50.

Shoulder cuff 122 includes a plurality of motors 124*a-f* mounted on mounting brackets 127*a-f*. In an exemplary embodiment, motors 124*a-f* may be model EC 45-310713 motors, manufactured by Maxon Motor of Switzerland. Mounting brackets 127*a-f* may be permit attachment in the orientations shown or rotated 90 degrees from the orientations shown. The motors may be mounted in the orientation shown, or with one or more of the brackets rotated 90 degrees relative to the position shown. In one embodiment, all of the brackets may be configured so that the motors are all mounted in an orientation parallel to motor 124*d*.

A spool 125*a-f* is coupled to the output of each motor 124*a-f*. Filaments 126*a-f* are coupled to each respective spool 125*a-f*. Filaments 126*a-f* may be metal wire cables, a polymer line such as nylon, or other suitable material sufficiently strong to manipulate forearm 52 and upper arm 54, yet be able to be wound onto spools 125*a-f*. Motors 124*a-f* operate in a first direction to wind filaments 126*a-f* onto respective spools 125*a-f* and in a second, opposite direction, to pay out filaments 126*a-f* from respective spools 125*a-f*.

Motors 124*a* and 124*b* control pivoting of first cuff 102 along the plane of the pivot of forearm 52 relative to upper arm 54. Each filament 126*a*, 126*b* passes through a respective redirection point 118*a*, 118*b* and is coupled to a respective connection point 106*a*, 106*b* on first cuff 102. Filament 126*a* is coupled to connection point 106*a* on the outside of first cuff 102 such that the winding of filament 126*a* onto spool 125*a* and pay out of filament 126*b* from spool 125*b* bends forearm 52 outward relative to elbow joint 56. Filament 126*b* is coupled to connection point 106*b* on the inside of first cuff 102 such that the paying out of filament 126*a* from spool 125*a* and winding up of filament 126*b* onto spool 125*b* bends forearm 52 inward relative to elbow joint 56. As used herein, the term "outside" refers to the exterior portion of elbow joint 56 and the term "inside" refers to an interior portion of elbow joint 56.

Motors 124*c-f* and respective filaments 126*c-f* control pivoting of second cuff 112 and the movement of upper arm 54 relative to body 58. Filaments 126*c* and 126*d* are connected to respective redirection points 118*a* and 118*b*. Filament 126*e* is connected to connection point 116*a* and filament 126*f* is connected to connection point 116*b*. Motors 124*c-f* operate to selectively pay out and/or wind up filaments 126*c-f* to pivot upper arm 54 about shoulder 60. While exemplary connection points 106*a*, 106*b*, 116*a*, 116*b* and redirection points 118*a*, 118*b* are shown and discussed above, those skilled in the art will recognize that the location of connection points 106*a*, 106*b*, 116*a*, 116*b* and redirection points 118*a*, 118*b* may be obtained via optimization, including comfort and use information obtained from individual users.

The positioning and orientation of motor/spool combinations on the shoulder cuff can be optimized to maximize mobility within the overall workspace reachable by the arm, as well as optimized to perform specific tasks, such as eating, as detailed by Agrawal et al., "Design and Optimization of a Cable Driven Upper Arm Exoskeleton," *Journal of Medical Devices*, Vol. 3, Aug. 31, 2009, incorporated herein by reference in its entirety. It should be understood, however, that the invention is not limited to any particular orientations, locations, or number of motor/spool combinations, nor is the invention limited to any particular type of motor/spool or mounting relationship between the motor/spool and the brackets.

Although not shown, each motor 124*a-f* includes an encoder that record the movement of its respective motor 124*a-f* and transmits a signal to a processor 130 that indicates the amount of filament 126*a-f* that has been paid out from and/or wound up onto spools 125*a-f*.

Processor 130 is also operatively coupled to motors 124*a-f* to transmit signals to motors 124*a-f* to selectively pay out and/or wind up filaments 126*a-f* according to signals received by processor 130 from a plurality of preprogrammed tasks contained in processor 130. The encoders on motors 124*a-f* transmit signals to processor 130 to provide information to processor 130 so that processor 130 transmits signals to motors 124*a-f* to operate for a proper amount of time.

By way of example, a preprogrammed task may be to use a fork to move food from a plate to the user's mouth. The encoders on motors 124*a-f* transmit information to processor 130 such that processor 130 transmits signals to the correct motors 124*a-f* to operate some or all of motors 124*a-f* to accomplish this task. Further, processor 130 may be programmed to adjust its assistance over time, from, for example, an assistive device that generates the bulk of the energy and arm manipulation required to complete the required task, to a rehabilitative device that allows the user to self-manipulate his/her arm, with exoskeleton 100 providing less and less support as the user gains strength in the arm.

Processor 130 and motors 124*a-f* may be powered by a DC battery 131. In order to reduce the weight of exoskeleton 100 on arm 50, processor 130 and battery 131 may be worn by the user on an external backpack or belt (not shown). Battery 131 may be rechargeable.

Figure 2:
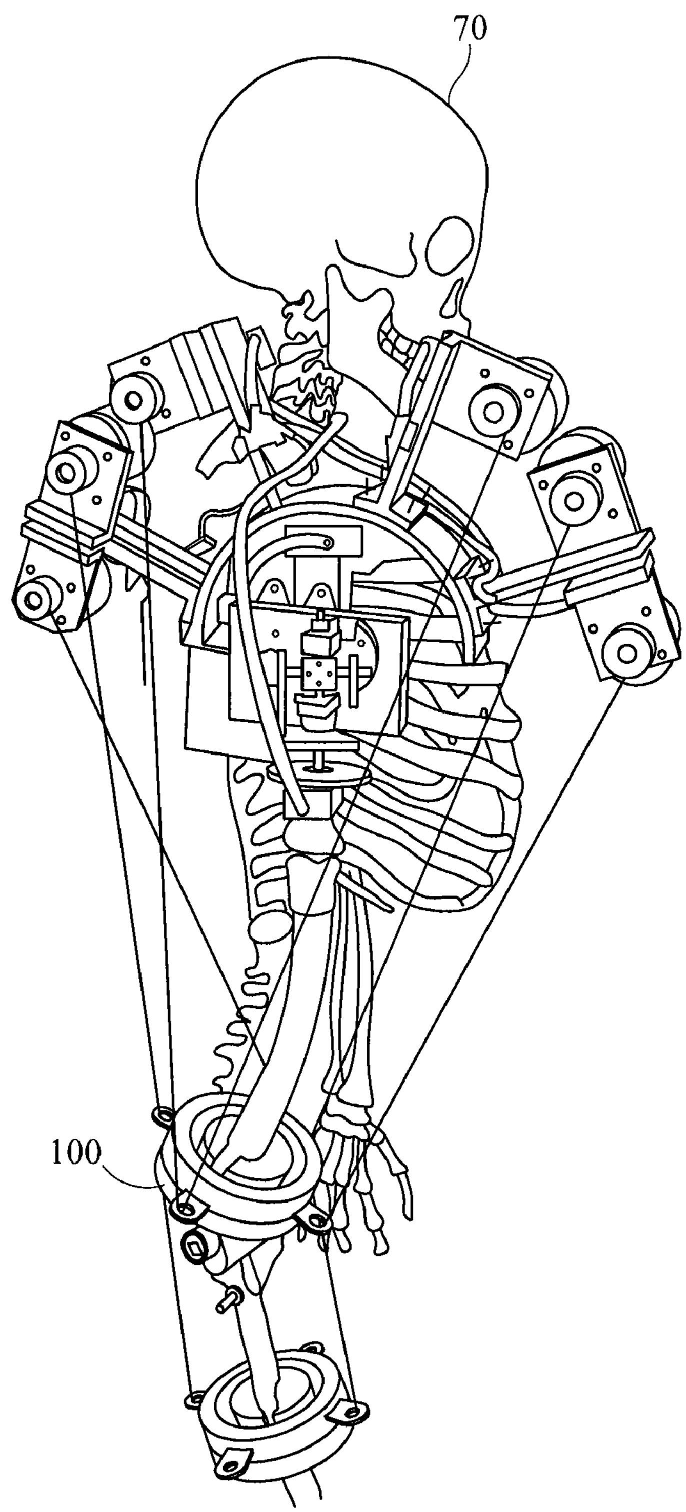
FIG. 2 is a perspective view of the exoskeleton illustrated in FIG. 1 coupled to a skeleton.

Referring now to FIG. 2, exoskeleton 100 may be used in a laboratory environment or to calibrate exoskeleton 100 prior to its use with user 50. In the laboratory or during calibration of exoskeleton 100, additional devices may be applied to exoskeleton 100 that are not used when exoskeleton 100 is mounted on a user. In such an environment, exoskeleton 100 may be mounted on skeleton 70, which simulates the user.

Figure 3:
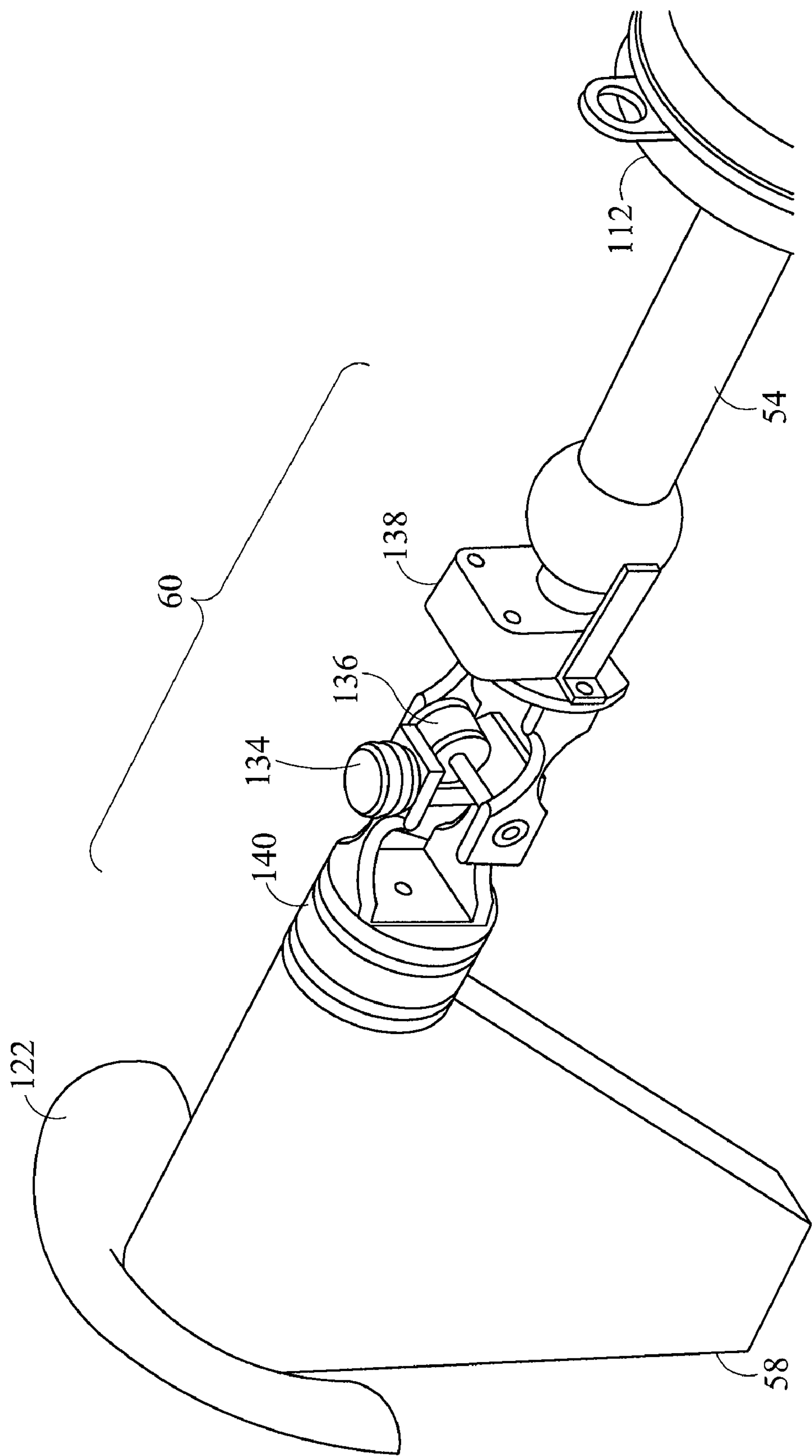
FIG. 3 is an enlarged view of a portion of FIG. 1, illustrating sensors and encoders that may be used during testing and/or calibration of the exoskeleton.

The additional devices may include a plurality of encoders 132, 134, 136, 138 that are coupled to joints in arm 50, as shown in FIGS. 1 and 3. Although not shown, encoders 132, 134, 136, 138 are operatively coupled to processor 130 in order to provide signals to processor 130. The signals provide information about the locations of forearm 52 and upper arm 54 relative to each other and to scapula 58.

Encoder 132 is coupled to elbow joint 56. An exemplary encoder 132 may be an M4 encoder, manufactured by Avtron Industrial Automation, Inc. of Independence, Ohio. Encoder 132 measures the relative position of forearm 52 with respect to upper arm 54 as forearm 52 pivots about elbow joint 56 in the plane relative to upper arm 54.

Encoders 134, 136, 138 are coupled to shoulder 60 to measure the relative position of upper arm 54 with respect to scapula 58. Exemplary encoders 134, 136 may be M4 encoders, manufactured by Avtron Industrial Automation, Inc. of Independence, Ohio. Encoder 138 may be an H5D encoder, manufactured by US Digital Corporation of Vancouver, Wash. Encoder 138 differs from encoders 132, 134, 136 in order for encoder 138 to measure the rotation of upper arm 54 about three orthogonal axes. Encoders 134, 136, 138 are coupled to shoulder 60 with respect to each other in order to measure location of shoulder in three planes in order to calibrate exoskeleton 100 on a testbed, such as skeleton 70 (shown in FIG. 2).

Also, a force/torque sensor 140 is also mounted on scapula 58 to measure forces and torque on arm 50 in order to maintain arm 50 in a desired location. An exemplary force-torque sensor 140 may be a Mini 45 F/T six axis sensor manufactured by ATI Industrial Automation of Apex, N.C. Although not shown, the output of force/torque sensor 140 is coupled to processor 130 to provide information regarding force/moment transmitted from arm 50 to scapula 58 to ensure that forces/moments experienced during operation of exoskeleton 100 are not detrimental to the human shoulder. Output from force/torque sensor 140 allows technicians to manipulate processor 130 to adjust the operation of motors 124*a-f* or to look for alternative locations of cuffs 102, 112 on the user, and/or alternative connection points of filaments 126*a-f* on cuffs 102, 112 in order to provide less stressful operation of exoskeleton 100.

Exoskeleton 100 may be used to assist in physical rehabilitation of stroke victims as well as to assist in the movement of extremities for users who suffer from a muscle-related disease, such as, for example muscular dystrophy. Exoskeleton 100 is sized to allow a jacket (not shown) to be worn over top of exoskeleton 100 in order to conceal exoskeleton 100 from view.

While exoskeleton 100 is described above as useful to manipulate forearm 52 and upper arm 54, those skilled in the art will recognize that exoskeleton 100 may also be extended beyond forearm 52 to manipulate a wrist (not shown) as well.

While one application for exoskeleton 100 is to assist a user in moving his/her extremities, exoskeleton 100 of the present invention may also serve as a robotic manipulator due to its ability to mimic movement of extremities such as a forearm and upper arm relative to a body.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An exoskeleton comprising:

a first cuff adapted to be coupled to a lower portion of a user's limb;

a second cuff adapted to be coupled to an upper portion of the user's limb;

a third cuff adapted to be coupled the user's body;

a first motor mounted on the third cuff and having a first motor output coupled to the first cuff;

a second motor mounted on the third cuff and having a second motor output coupled to the second cuff;

a third motor mounted on the third cuff and having a third motor output coupled to the first cuff; and a processor operatively coupled to the first, second, and third motors and configured to transmit signals to manipulate the first cuff and the second cuff relative to the third cuff for enabling the first cuff and the second cuff to move the lower portion of the user's limb and upper portion of the user's limb, wherein the first motor and the third motor are configured to operatively pivot the lower portion of the user's limb relative to the upper portion of the user's limb about a joint.

2. The exoskeleton according to claim 1, wherein the joint permits the lower portion of the user's limb to pivot along a plane relative to the upper portion of the user's limb and wherein the first motor output is adapted to be coupled to the first cuff along the plane.

3. The exoskeleton according to claim 1, wherein the first motor output is coupled to the first cuff through the second cuff.

4. The exoskeleton according to claim 1, further comprising a fourth motor, a fifth motor, and a sixth motor, each of the fourth, fifth, and sixth motors having respective outputs coupled to the second cuff.

5. The exoskeleton according to claim 4, wherein the outputs of the second, fourth, fifth, and sixth motors are spaced around the second cuff at 90 degree increments from adjacent outputs.

6. The exoskeleton of claim 1, wherein each motor comprises a spool attached thereto and each motor output comprises a filament attached to and configured to be being wound and unwound on the spool in response to movement of the motor.

7. The exoskeleton of claim 6, wherein the filament comprises metal wire or nylon.

8. A method of operating an exoskeleton comprising the steps of:

providing the exoskeleton of claim 1 on a user's arm; and transmitting a signal from the processor to at least one of the first and second motors to operate at least one of the first and second motors, wherein the user's arm is manipulated by the exoskeleton to perform a predetermined task.

9. The method according to claim 8, further comprising the step of programming the processor to adjust assistance transmitted to the user's arm by the exoskeleton over time.

10. The method according to claim 8, wherein the signal transmitting step comprises selecting a task corresponding to the signal bring transmitted from a plurality of tasks.

* * * * *